(12) United States Patent
Veitch et al.

(10) Patent No.: US 10,837,459 B2
(45) Date of Patent: Nov. 17, 2020

(54) MISTUNED FAN FOR GAS TURBINE ENGINE

(71) Applicant: PRATT & WHITNEY CANADA CORP., Longueuil (CA)

(72) Inventors: Thomas Veitch, Scarborough (CA); Farid Abrari, Mississauga (CA); Ernest Adique, Brampton (CA); Daniel Fudge, Vaughan (CA); Kari Heikurinen, Oakville (CA); Paul Stone, Guelph (CA); Ignatius Theratil, Mississauga (CA); Peter Townsend, Longueuil (CA); Tibor Urac, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 416 days.

(21) Appl. No.: 15/726,819

(22) Filed: Oct. 6, 2017

(65) Prior Publication Data

US 2019/0107123 A1    Apr. 11, 2019

(51) Int. Cl.
  *B63H 1/26*  (2006.01)
  *F04D 29/66*  (2006.01)
  (Continued)

(52) U.S. Cl.
  CPC .......... *F04D 29/666* (2013.01); *F01D 5/141* (2013.01); *F04D 29/324* (2013.01);
  (Continued)

(58) Field of Classification Search
  CPC .... F04D 29/666; F04D 29/324; F04D 29/327; F04D 29/388; F01D 5/141; F05D 2220/36; F05D 2240/301; F05D 2260/961
  (Continued)

(56) References Cited

U.S. PATENT DOCUMENTS 3,536,417 A * 10/1970 Merkle ................. F04D 29/284
                                                  416/223 R
3,758,233 A    9/1973 Newman
(Continued)

FOREIGN PATENT DOCUMENTS

DE    102009033618    1/2011
EP    1211382    6/2002
(Continued)

OTHER PUBLICATIONS

European Search Report of Application No. 18194363.0 dated Feb. 11, 2019.
(Continued)

*Primary Examiner* — Hung Q Nguyen
*Assistant Examiner* — Anthony Donald Taylor, Jr.
(74) *Attorney, Agent, or Firm* — Norton Rose Fulbright Canada LLP (57) ABSTRACT

A fan for a gas turbine engine comprises blades distributed around a hub. The blades include first and second blades, having geometric parameters and/or material properties that differ from each other to frequency mistune the fan. The blades are distributed about the hub with at least one second blade between adjacent first blades. The leading edge of the airfoil of the second blades is disposed axially aft of the corresponding leading edge of the first blades in at least a portion of the blade span.

33 Claims, 9 Drawing Sheets

(51) Int. Cl.
  *F04D 29/32* (2006.01)
  *F01D 5/14* (2006.01)
  *F04D 29/38* (2006.01)

(52) U.S. Cl.
  CPC ......... *F04D 29/327* (2013.01); *F04D 29/388* (2013.01); *F05D 2220/36* (2013.01); *F05D 2240/301* (2013.01); *F05D 2260/961* (2013.01)

(58) Field of Classification Search
  USPC ........................................................ 416/203
  See application file for complete search history.

(56) References Cited

U.S. PATENT DOCUMENTS

| | | | |
|---|---|---|---|
| 4,492,522 A | 1/1985 | Rossmann et al. | |
| 4,878,810 A | 11/1989 | Evans | |
| 5,286,168 A | 2/1994 | Smith | |
| 5,667,361 A * | 9/1997 | Yaeger | F01D 5/22 416/193 R |
| 6,042,338 A * | 3/2000 | Brafford | F01D 5/10 29/889 |
| 6,059,533 A | 5/2000 | Stoker et al. | |
| 6,379,112 B1 * | 4/2002 | Montgomery | F01D 5/145 415/119 |
| 6,428,278 B1 | 8/2002 | Montgomery et al. | |
| 6,471,482 B2 | 10/2002 | Montgomery et al. | |
| 7,354,243 B2 | 4/2008 | Harvey | |
| 7,690,890 B2 | 4/2010 | Aotsuka et al. | |
| 7,753,652 B2 | 7/2010 | Truckenmueller et al. | |
| 8,043,063 B2 | 10/2011 | Kelly et al. | |
| 8,540,490 B2 | 9/2013 | Ramakrishnan et al. | |
| 8,656,589 B2 | 2/2014 | Kurt-Elli | |
| 8,727,716 B2 | 5/2014 | Clements et al. | |
| 9,097,125 B2 | 8/2015 | Ghorbani et al. | |
| 9,382,916 B2 | 7/2016 | Schoenenborn | |
| 9,410,436 B2 | 8/2016 | Kulathu et al. | |
| 2002/0064458 A1 * | 5/2002 | Montgomery | F01D 5/10 415/208.3 |
| 2002/0067991 A1 * | 6/2002 | Montgomery | F01D 5/10 416/203 |
| 2005/0042384 A1 | 2/2005 | Benedetti et al. | |
| 2007/0020101 A1 * | 1/2007 | Balamucki | F01D 5/10 416/219 R |
| 2007/0175032 A1 | 8/2007 | Kurt-Elli | |
| 2008/0134504 A1 | 6/2008 | Schoenenborn | |
| 2010/0247310 A1 * | 9/2010 | Kelly | F01D 5/10 416/1 |
| 2011/0044818 A1 | 2/2011 | Kuhne et al. | |
| 2012/0057982 A1 * | 3/2012 | O'Hearn | F01D 9/041 416/223 A |
| 2012/0148401 A1 * | 6/2012 | Kulathu | F01D 5/10 416/1 |
| 2013/0078084 A1 | 3/2013 | Gendrich et al. | |
| 2013/0142659 A1 * | 6/2013 | Glaspey | F01D 5/284 416/241 A |
| 2013/0170947 A1 * | 7/2013 | Kurt-Elli | F01D 25/06 415/1 |
| 2013/0189111 A1 | 7/2013 | Woehler et al. | |
| 2013/0195652 A1 | 8/2013 | Pope | |
| 2013/0236319 A1 | 9/2013 | Rockarts et al. | |
| 2014/0050590 A1 * | 2/2014 | Ghorbani Zarimahalleh | F01D 5/16 416/241 R |
| 2014/0090380 A1 | 4/2014 | Aggarwala et al. | |
| 2015/0078908 A1 | 3/2015 | Calza | |
| 2015/0110604 A1 * | 4/2015 | Calza | F01D 9/041 415/119 |
| 2015/0139789 A1 | 5/2015 | Schoenenborn | |
| 2015/0260046 A1 | 9/2015 | Broszat et al. | |
| 2015/0322803 A1 * | 11/2015 | Fulayter | F01D 5/16 416/231 B |
| 2016/0017796 A1 * | 1/2016 | Xu | F01D 5/143 415/208.2 |
| 2016/0076392 A1 | 3/2016 | Thomas | |
| 2016/0238034 A1 * | 8/2016 | Fulayter | F04D 29/668 |
| 2017/0159465 A1 | 6/2017 | Schlemmer et al. | |
| 2017/0175761 A1 * | 6/2017 | Schwarz | F04D 19/002 |
| 2017/0175776 A1 | 6/2017 | Theratil et al. | |
| 2018/0038382 A1 * | 2/2018 | Foster | F02C 3/04 |
| 2018/0080450 A1 * | 3/2018 | Glavicic | F04D 29/023 |
| 2019/0101002 A1 | 4/2019 | Duffin et al. | |

FOREIGN PATENT DOCUMENTS

| | | |
|---|---|---|
| EP | 1211383 | 6/2002 |
| EP | 1746249 | 1/2007 |
| EP | 1813773 | 8/2007 |
| EP | 1985803 | 10/2008 |
| WO | 2014/070279 | 5/2014 |
| WO | 2015/041758 | 3/2015 |

OTHER PUBLICATIONS

European Search Report of Application No. 18194668.2 dated Mar. 1, 2019.
European Search Report of Application No. 18194634.4 dated Jan. 29, 2019.
European Search Report of Application No. 18194666.6 dated Feb. 21, 2019.
Smith, Hubert—The Illustrated Guide to Aerodynamics. TAB Books. 2nd Edition, p. 21. (Year: 1992).

* cited by examiner

MISTUNED FAN FOR GAS TURBINE ENGINE

TECHNICAL FIELD

The application relates generally to compressor rotors for gas turbine engines, and more particularly to mistuned fans.

BACKGROUND

Aerodynamic instabilities, such as but not limited to flutter, can occur in a gas turbine engine when two or more adjacent blades of a rotor of the engine, such as the fan, vibrate at a frequency close to their natural frequency and the interaction between adjacent blades maintains and/or strengthens such vibration. Other types of aerodynamic instability, such as resonant response, may also occur and are undesirable. Prolonged operation of a rotor undergoing such aerodynamic instabilities can produce potentially undesirable results when airfoil stress load levels exceed threshold values. Attempts have been made to mistune adjacent blades of such rotors, so as to separate their natural frequencies.

SUMMARY

There is accordingly provided a fan for a gas turbine engine, the fan configured for rotation about a rotational axis defining an axial direction, the fan comprising blades circumferentially distributed around a hub, each of the blades having an airfoil extending from the hub to a tip defining a full span of the airfoil, the airfoils having a leading edge and a trailing edge, the blades including at least a plurality of a first blades and second blades having different geometric parameters and/or material properties selected to frequency mistune the first and second blades, the first and second blades circumferentially distributed about the hub with at least one of the second blades circumferentially disposed between adjacent first blades, the leading edge of the second blades disposed axially aft of the corresponding leading edge of the first blades in at least a portion of an outermost 10% of the full span of the blades.

There is also provided a gas turbine engine having a fan configured for rotation about a rotational axis defining an axial direction, the fan comprising blades circumferentially distributed around a hub, each of the blades having an airfoil extending substantially radially from the hub to tips of the blades to define a full span of the airfoil, the airfoils having a leading edge and a trailing edge, the blades including a first subset of blades and a second subset of blades, the blades of the first subset of blades configured to be more resistant to foreign object damage than the blades of the second subset of blades, the first subset of blades having a natural vibration frequency different than a natural vibration frequency of the second subset of blades to frequency mistune the blades of the first and second subsets of blades, wherein the blades of the second subset of blades are circumferentially interspaced between the blades of the first subset of blades and the leading edge of the blades of the second subset of blades is disposed axially aft of the leading edge of the blades of the first subset of blades in at least a portion of an outermost 10% of the full span of the blades.

There is further provided a method of forming a rotor of a gas turbine engine, the method comprising: providing first blades and second blades having different geometric parameters and/or material properties from each other to frequency mistune the first and second blades; circumferentially positioning at least one of the second blades between two of the first blades, and axially offsetting said at least one of the second blades relative to said two of the first blades by positioning a leading edge of the second blades axially aft of the leading edge of the first blades in at least a portion of an outermost 10% of a full span of the first and second blades; and fastening the first and second blades to a hub of the rotor.

BRIEF DESCRIPTION OF THE DRAWINGS

Reference is now made to the accompanying figures in which.

DETAILED DESCRIPTION

Figure 1:
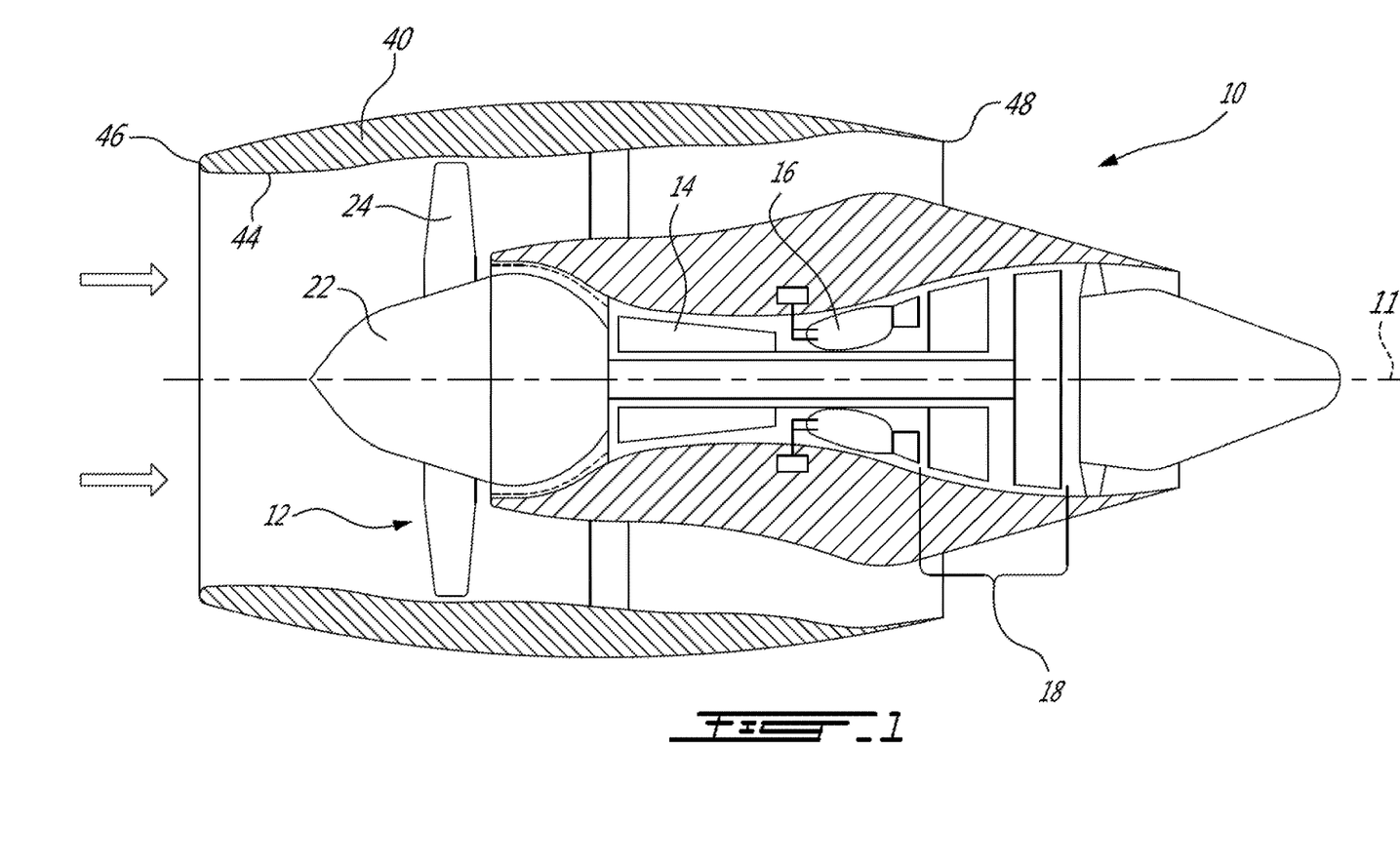
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Engine 10 also comprises a nacelle 40 for containing various components of engine 10. Nacelle 40 has an annular interior surface 44, extending axially from an upstream end 46 (often referred to as the nose/inlet cowl) to a downstream end 48, for directing the ambient air (the direction of which is shown in double arrows in FIG. 1). Although the example below is described as applied to a fan of a turbofan engine, it will be understood the present teachings may be applied to any suitable gas turbine compressor rotor.

Figure 2:
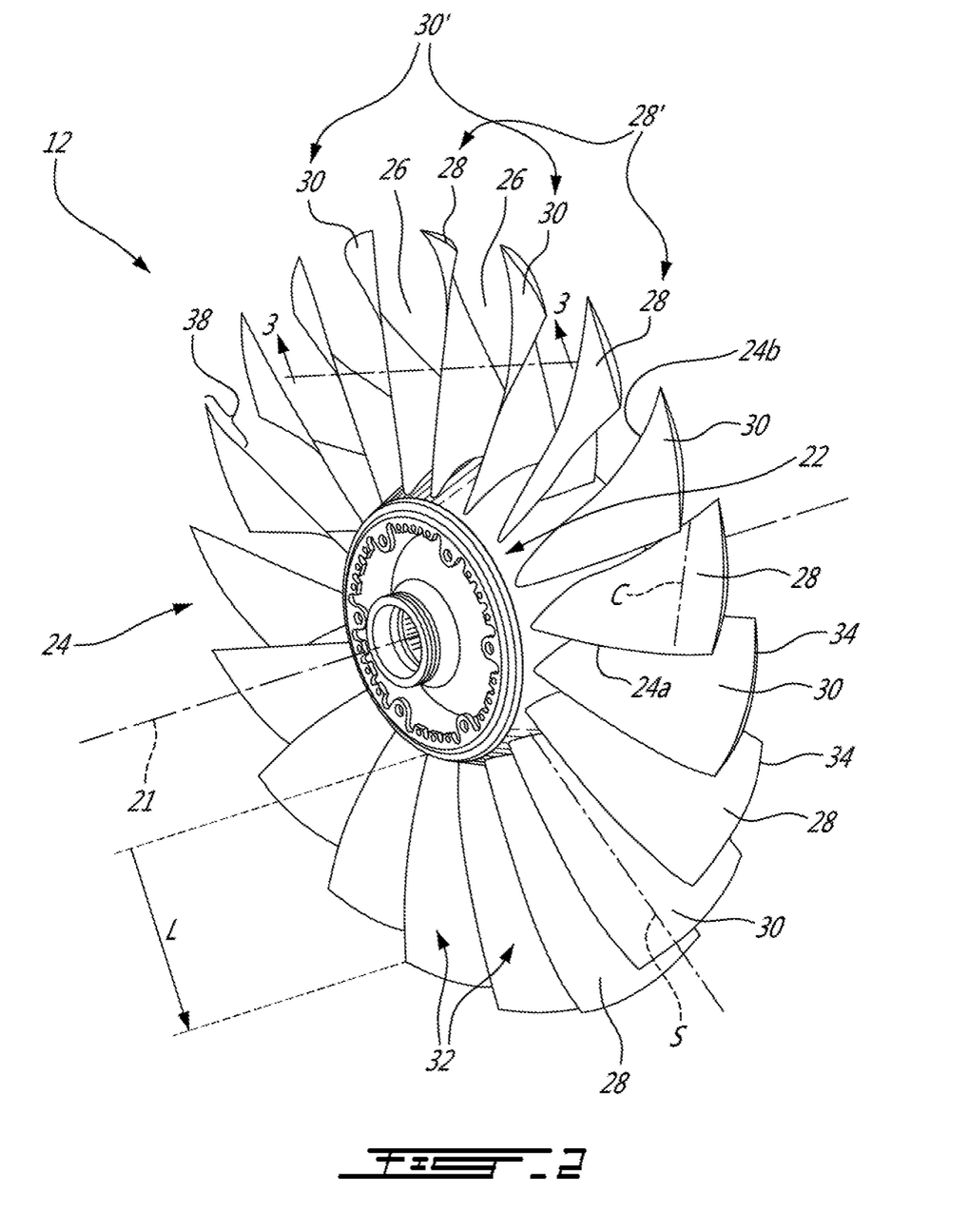
FIG. 2 is a schematic perspective view of a fan rotor of the gas turbine engine shown in FIG. 1.

As shown in more detail in FIG. 2, the fan 12 includes a central hub 22, which in use rotates about an axis of rotation 21, and a circumferential row of fan blades 24 that are circumferentially distributed and which project a total, or full span length L from hub 22 in a span-wise direction (which may be substantially radially) toward tips of the blades 24. The axis of rotation 21 of the fan 12 may be coaxial with the main engine axis, or rotational axis, 11 of the engine 10 as shown in FIG. 1. The fan 12 may be either a bladed rotor, wherein the fan blades 24 are separately formed and fixed in place on the hub 22, or the fan 12 may be an integrally bladed rotor (IBR), wherein the fan blades 24 are integrally formed with the hub 22. In a particular embodiment, the blades 24 are welded to the hub 22, to form an IBR. Each circumferentially adjacent pair of fan blades 24 defines an inter-blade passage 26 therebetween for the working fluid.

The circumferential row of fan blades 24 of fan 12 includes two or more different types of fan blades 24, in the sense that a plurality of sets of blades are provided, each set having airfoils with non-trivially different properties, including but not limited to aerodynamic properties and/or shapes, which differences will be described in more detail below with reference to the figures. While the properties and configuration of these rotor blades 24 will be described herein with particular reference to a fan 12, it is to be understood that the present disclosure may be similarly applied to other rotors of the gas turbine engine, including for example, but not limited to, other compressor rotors.

Flow-induced resonance refers to a situation where, during operation, adjacent vibrating blades transfer energy back and forth through the air medium, which energy continually maintains and/or strengthens the blades' natural vibration mode. Fan blades 24 have a number of oscillation patterns, any of which, if it gets excited and goes into resonance, can result in flow induced resonance issues. As such, it is desirable to frequency mistune select blades in the fan such as to limit the effects of such flow-induced resonance.

The fan 12 therefore includes two or more types of fan blades 24. More specifically, the fan 12 is composed, in this example, of a first subset 28' of blades and at least a second subset 30' of blades. Each of these subsets of blades respectively comprise fan blades which have common, if not identical, geometric parameters and/or material properties. The geometric parameters and/or material properties of each subset however differs from the other subset(s). More than two blade types and subsets of blades may therefore also be used. The first subset 28' includes first fan blades 28 and the second subset 30' includes second blades 30. The first and second blades 28 and 30 have geometric parameters and/or material properties which are different from one another, as will be described and shown in further details below, in order to frequency mistune the fan 12.

In the embodiment shown, the blades 30 of the second subset 30' are circumferentially interspaced between two adjacent blades 28 of the first subset 28'. It is to be understood that fan blades 24 need not comprise pairs of first and second blades, or even numbers thereof, or of only two blade types. For example, each set of fan blades may include three or more fan blades which differ from each other, e.g. a circumferential distribution of the fan blades may include, in circumferentially successive order, blade types: A, B, C, A, B, C; or A, B, C, D, A, B, C, D, etc., wherein each of the capitalized letters represent different types of blades as described above. It is understood that although the fan 12 comprises circumferentially alternating first and second blades 28 and 30, the fan 12 may comprise only one second blade 30 sandwiched between select pairs of the first blades 28.

The different geometric parameters and/or material properties of the first and second fan blades 28 and 30 are selected to frequency mistune the first and second blades 28 and 30, by providing a natural vibrational frequency separation between the first and second blades 28 and 30 sufficient to reduce or impede unwanted resonance between the blades 24. Regardless of the exact amount of frequency separation, the first and second fan blades 28 and 30 are therefore said to be intentionally "mistuned" relative to each other, in order to reduce the occurrence and/or delay the onset, of flow-induced resonance. Such a mistuning may be obtained by varying the geometric parameters and/or the material properties of the blades 24. These geometric parameters and/or the material properties may include, for instance, the mass, the elastic modulus, the stiffness, the constituent material(s), blade thickness, thickness distribution along the span, tip profile, leading edge profile, etc.

The differences in geometric parameters and/or material properties between the first and second blades 28 and 30 may however result in certain blades being structurally weaker than others. In the present example, the second blades 30 are structurally weaker than the first blades 28, as a result of their differences in geometric parameters and/or material properties required to achieve the aforementioned frequency mistuning. In so doing, the first blades 28 are therefore structurally stronger than the second blades 30, and thus more resistant to foreign object damage. As will now be explained, in order to better "protect" the structurally weaker but aerodynamically more efficient second blades 30, they are accordingly positioned on the fan rotor in an axial position that is offset from the first blades 28, which are structurally stronger and more resistant to foreign object damage (but may also be less aerodynamically efficient). As will be seen, this enables the weaker second blades 30 to be better shielded, or protected, from foreign object damage.

Still referring to FIG. 2, the blades 24 include airfoils 32 extending substantially radially from the hub 22 toward tips 34 of the blades 24 along span-wise axes S. The airfoils 32 have leading edges 24a and trailing edges 24b axially spaced apart from one another along chord-wise axes C. A full span of the blades 24 extend from the hub 22 to the tips 34. In the embodiment shown, the tips 34 of the blades 24 are unsupported, making the blades cantilevered from the hub 22.

As noted above, the geometric parameters and/or material properties differing between blades may include the thickness distribution of the blades, a variation of the chord lengths of the airfoils 32 from the hub 22 to the tips 34, a variation of an axial position of the leading edge 28a, 30a of the blades from the hub 22 to the tips, and any other geometric parameters known in the art that may affect a shape of a blade (e.g., twist angle, tip profile, trailing edge profile, dihedral angle, sweep angle). In a particular embodiment, the first blades 28 are stronger (and thus more resistant to foreign object damage) than the second blades 30, at least in part because a thickness distribution of the first blades 28 is different than a thickness distribution of the second blades 30. The thickness distribution is defined as a variation of a thickness of the blades 24 in function of a position along their chord-wise C and span-wise S axes. In a particular embodiment, the difference in thickness distributions causes a drag coefficient of the first blades 28 to be higher than a drag coefficient of the second blades 30. Hence, the first blades 28 in such an embodiment would tend to be aerodynamically less efficient than the second blades 30. In such embodiment, the second blades 30, which are structurally weaker but aerodynamically more efficient than the first blades 28, may be more prone to failure when impacted by a foreign object. Hence, the second blades 30 may require shielding, or protection, against foreign object damage. As the tips 34 of the blades 24 are typically more susceptible to foreign object damage, axial deflection or deformation of the tips 34 in a standard fan is expected to be greater than that of a more radially portion of the blades 24 closer the hub 22, following an impact on the blades of the fan by a foreign object. Hence, it has been found that it is desirable to shield, or protect, at least an outermost portion of the weaker blades 24 against foreign object damage. This outermost portion of the blades, as will be seen, includes the outermost 10% of the full span of the blades.

Figure 3A:
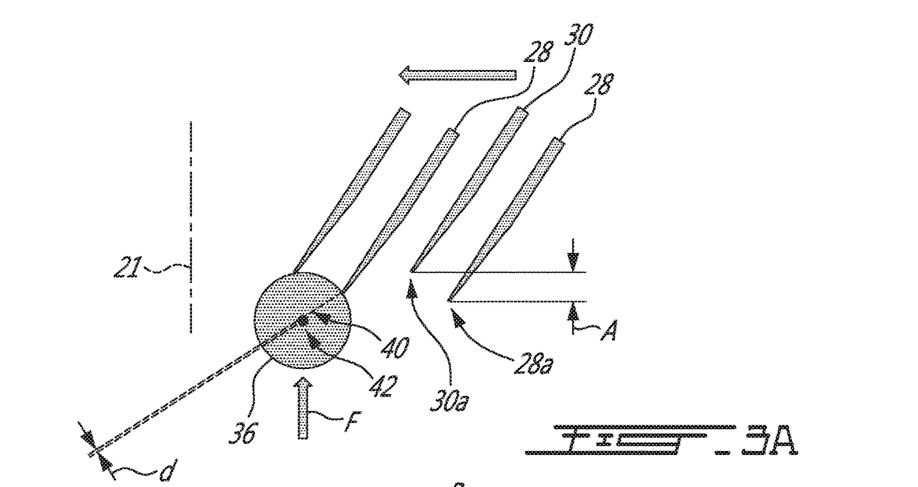
FIGS. 3A-3C are a schematic cross-sectional views taken along line 3-3 of FIG. 2.
Figure 3B:
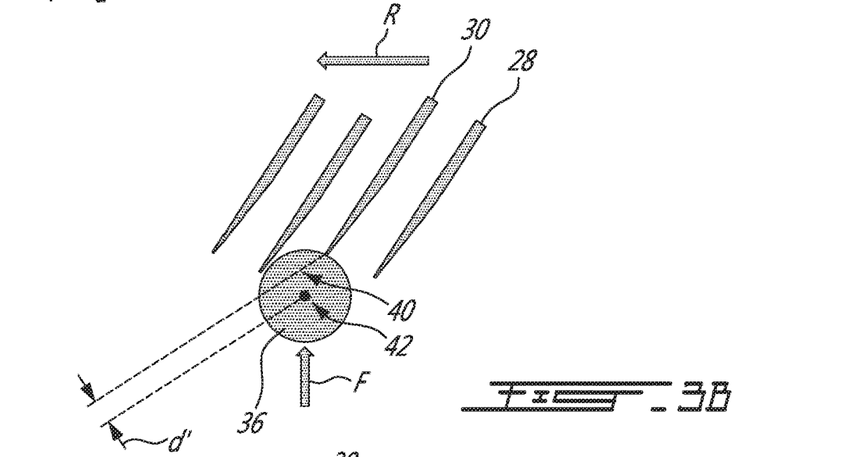
Figure 3C:
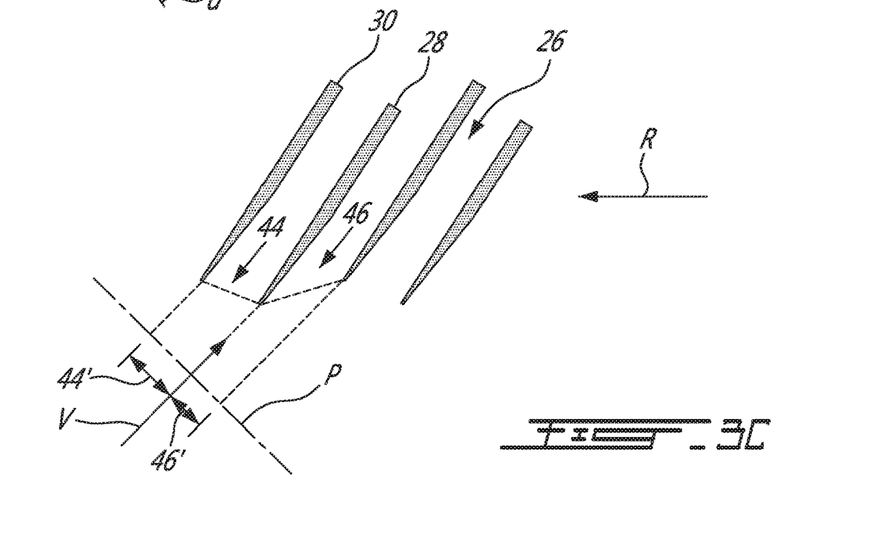

Referring now to FIGS. 3A to 3C, at least a portion of the leading edges 28a of the first blades 28 are disposed axially forward of a corresponding portion of the leading edges 30a of the second blades 30 by an axial offset A, relative to the rotational axis 21, during operation. Accordingly, at least a portion of the leading edges 28a of the first blades 28 are disposed upstream relative to a corresponding portion of the leading edge 30a of the second blades 30, relative to a flow of air through the fan. Consequently, the leading edges of the first and second blades 28 and 30 are said to be axially offset. In this way, the at least a portion of the leading edges 28a of the first blades 28 is disposed axially forward of the corresponding portion of the leading edges 30a of the second blades 30 relative to the engine 10 and/or upstream relative to an incoming flow F that passes through the passages 26 of the fan 12 thereof. The axial offset A corresponds to a distance along the rotational axis 21 between the leading edges 28a of the first blades 28 and the leading edges 30a of the second blades 30.

In a particular embodiment, the value of the axial offset A is obtained by dividing a velocity of an incoming object by a blade pass frequency, which corresponds to the frequency at which blades pass by a stationary test point. For example, for a fan having 10 blades rotating at 1000 Hz, the blade pass frequency is 10000 Hz. In the embodiment shown, the fan 12 has a blade pass frequency of about 3000 Hz and, considering that the velocity of the object is 145 feet by seconds, the axial offset A corresponds to 0.048 feet (0.580 inch). In a particular embodiment, the value obtained by the above method corresponds to a maximum value of the axial offset A. The axial offset may range between about 5% and about 30% of the cord length of the blades. In the embodiment shown, the axial offset A of 0.580 inch corresponds to about 6-8% of the fan blade chord length. The axial offset A might alternately correspond to about 14% to 30% of the fan blade chord length for greater ingestion speeds typically associated with birds or hail stones.

Each of the blades 24 has a respective center of gravity between their respective leading and trailing edges 24a and 24b. In the embodiment shown, the center of gravity of the second blades 30 is disposed axially aft of the center of gravity of the first blades.

In the illustrated embodiment, the leading edges 28a of the first blades 28 are axially offset relative to the leading edges 30a of the second blades 30 over an entirety of their length, or span L, extending from the hub 21 to the tips 34. In a particular embodiment, however, only a portion of the leading edges 28a and 30a of the first and second blades 28 and 30 may be offset. Typically, the tip portions 38, of the blades 24 are more subject to failure following an impact with a foreign object 36. Hence, in a particular embodiment, only the tip portions 38 of the second blade leading edges 30a are disposed axially rearward relative to corresponding tip portions of the first blade leading edges 28a. Typically, the tip portions, or radially outward portions, 38 as defined herein extend from about 80% to 100% of the blade span L (i.e. blade length), and more specifically between 90% to 100% of the blade span L, and more specifically still between 95% and 100% of the blade span L. In a particular embodiment, the leading edge 30a of the airfoil of the blades 30 of the second subset 30' of blades is disposed axially aft of the leading edge 28a of the airfoil of the blades 28 of the first subset 28' of blades in at least a portion of an outermost 10% of the full span of the airfoils of the blades 24 of the first and second subsets 28',30' of blades. It is to be understood that the axial offset A between the first blade leading edges 28a and the second blade leading edges 30a may be located anywhere along the span-wise axes S to protect any portions of the second blades 30 that are known to be structurally weaker than corresponding portions of the first blades 28.

In a particular embodiment, the leading edge 30a of the blades 30 of the second subset 30' is disposed axially aft of the leading edge 28a of the blades 28 of the first subset 28' over an entirety of the outermost 10% of the full span of the airfoils 32, from 90% of the full span to the tips 34 of the blades 24.

In a particular embodiment, the leading edge 30a of the airfoil 32 of the blades 30 of the second subset 30' is disposed axially aft of the leading edge 28a of the airfoil 32 of the blades 28 of the first subset 28' in at least a portion of an outermost 5% of the full span of the airfoils of the blades of the first and second subsets of blades 28',30'.

In a particular embodiment, the leading edge 30a of the blades 30 of the second subset 30' is disposed axially aft of the leading edge 28a of the blades 28 of the first subset 28' over an entirety of the outermost 5% of the full span of the airfoils, from 95% of the full span to the tips 34 of the blades 24.

It is understood that each values expressed in percentages (particularly with respect to span-wise locations and/or percentage span of a blade, for example) may be subjected to a margin corresponding to ±5%. Ranges expressed in percentages (e.g., outmost 10%, or from X % to Y %) may be subjected to a margin proportional to the extent of the range. It is considered here that the lower and upper bounds of the range are each subjected to a margin corresponding to about ±a difference between the upper and lower bounds divided by 10.

In a particular embodiment, a leading edge profile of the first blades 28 corresponds to a leading edge profile of the second blades 30. A leading edge profile is defined as a variation of a position of the leading edge as a function of a radial position along the span-wise axis S. It is however to be understood that the leading edge profiles of the first and second blades 28 and 30 may also differ from each other, and that it is such a difference in the leading edge profiles that may create the axial offset of portions of the leading edges of the first and second blades 28 and 30.

In a particular embodiment, the leading edges 28a and 30a of the first and second blades 28 and 30 are axially aligned relative to the rotation axis 21 when the fan 12 is not in rotation. In this particular embodiment, the first and second blades 28 and 30 deflect differently relative to one another when in rotation such that an axial deflection of the second blades 30 is more pronounced than an axial deflection of the first blades 28. Hence, in rotation, the second blades 30 deflect more such that their leading edges 30a become disposed axially rearward to the first blade leading edges 28a relative to the rotational axis 21. This difference in axial deflections is the result of the structural differences between the first and second blades 28 and 30 as discussed herein above. In a particular embodiment, and with reference to FIG. 3A, the axial offset A between the first and second blade leading edges 28a and 30a is present when the fan 12 is not rotating and the axial offset A increases when the fan 12 is in rotation.

To operate the fan 12, the fan 12 is first provided with the first blades 28 and the second blades 30 around the hub 22 of the fan 12. Then, each of the second blades 30 is positioned circumferentially between two of the first blades 28. Then, the leading edges 30a of the second blades 30 are axially offset reward of the leading edges 28a of the first blades 28. In a particular embodiment, only the tip, or radially outward, portions 38 of the leading edges 30a of the second blades 30 are offset relative to corresponding portions of the first blades leading edges 28a. In a particular embodiment, as seen in FIG. 3A, the axial offset A between the leading edge of the second blades 30 requires rotation of the fan 12 about its axis 21 to manifest.

Referring more particularly to FIGS. 3A to 3C, when the object 36 contacts one of the first blades 28, a distance d between a cut path 40 extending through the object 36 and a center of mass 42 of the object is inferior to a similar distance d' (see FIG. 3B) when the object 36 contacts one of the second blades 30. Therefore, an impact force between the object 36 and the first blades 28 is expected to be superior to an impact force on the second blades 30. Stated otherwise, when the object 36 hits one of the first blades 28, the object 36 may be cut in half. However, when the object 36 hits one of the second blades 30, only a small portion of the object may be removed therefrom.

Still referring to FIGS. 3A-3C, the staggering of the first and second blade leading edges 28a and 30a creates alternating planes 44 and 46. Each of the planes 44 and 46 extends through a respective one of the inter-blade passages 26 and extends from the hub 22 toward the blade tips 34 and from the leading edge 28a of one of the first blades 28 toward the leading edge 30a of one of the second blades 30 that is circumferentially adjacent the one of the first blades 28. The planes 44 and 46 include forwardly oriented planes 44 and rearwardly oriented planes 46. The forwardly oriented planes 44 are oriented toward a direction of rotation, denoted by arrow R in FIG. 3C, of the fan 12 whereas the rearwardly oriented planes 46 are oriented in a direction opposite the direction of rotation.

Therefore, referring to FIG. 3C, an area 44', of the forwardly oriented planes 44 projected on a plane P that is normal to a resultant velocity vector V of the object 36 relative to the blades 24 is greater than an area 46' of the rearwardly oriented planes 46 projected on said plane P. Therefore, the sum of the projected areas 44' of the forwardly oriented planes 44 is superior to the sum of the projected areas 46' of the rearwardly oriented planes 46. Hence, the object 36 most likely hits the forwardly oriented planes 44 and the first blades 28 rather than the second blades 30. The staggering of the first and second blade leading edges 28a and 30a increases the probabilities that the object, when circulating in a direction parallel the rotational axis 21, hits one of the first blades 28 instead of one of the second blades 30.

Figure 4:
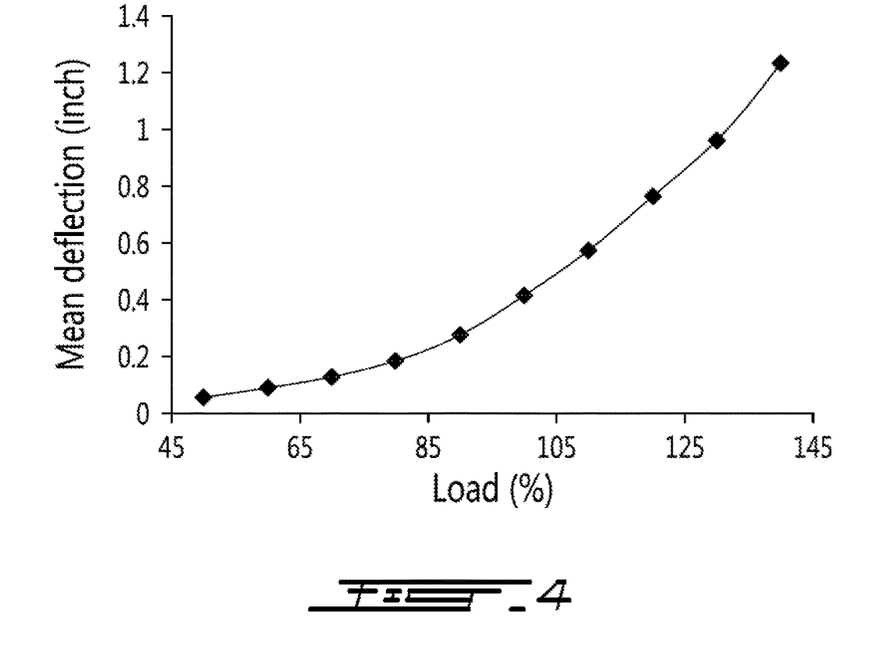
FIG. 4 is a graph illustrating a variation of a mean blade deflection in function of a load impacting blades of the fan rotor of FIG. 2.

Referring now to FIG. 4, a graph illustrates a variation of the mean axial deflection of the blades 24 when a load increases and when an axial offset is not present. The mean deflection is the average of the blade deflections between the hub 22 and the tips 34. The load represents the density of the object that hits the rotor blades 24. Dimensions of the object are kept constant. As illustrated, when the load increases, the mean deflection increases as well. A load of 150% is likely to break one of the blades 24.

Figure 5:
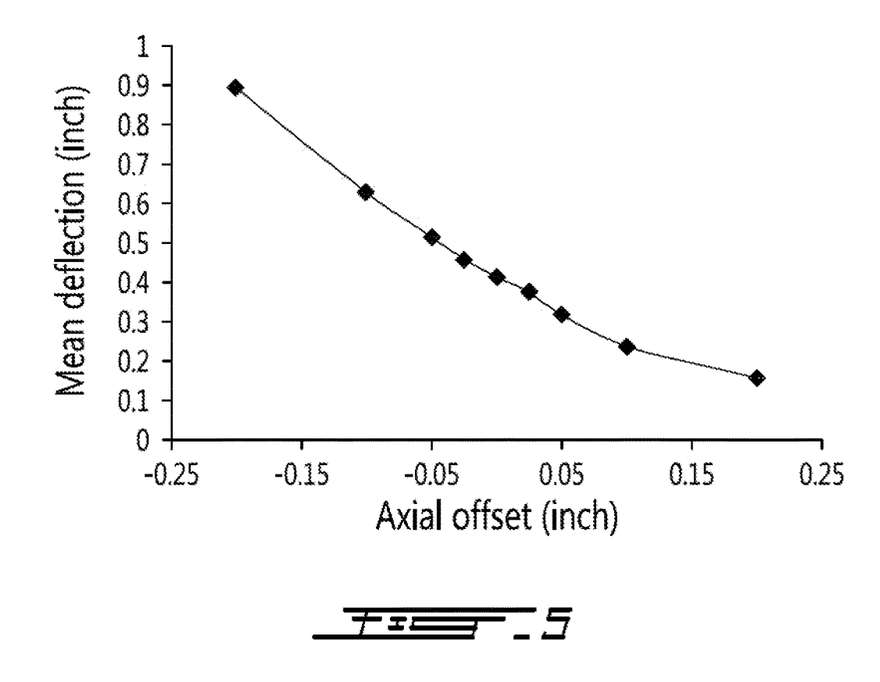
FIG. 5 is a graph illustrating a variation of the mean blade deflection in function of an axial offset of the blades of the fan rotor of FIG. 2.

Referring now also to FIG. 5, a graph illustrates a variation of the mean deflection of the blades 24 with a variation of an axial offset for a load of 100%. As illustrated, positioning the leading edge 24a of one of the blades 24 forward by 0.2 inch of the leading edges of two adjacent ones of the blades 24 creates the same mean deflection as if the one of the blades 24 were impacted with a load of 130% when no axial offset is present. However, inversing the offset such that the leading edge 24a of the one of the blades 24 is rearward by 0.2 inch of the leading edges of the two adjacent ones of the second blades 24 creates the same mean deflection as if the one of the blades 24 were impacted with a load of between 70% and 80% when no axial offset is present. Therefore, axially offsetting the leading edge of the one of the blades rearward of the leading edges of the two adjacent ones of the blades most likely decreases the force of the impact between the object 36 and the one of the blades. Consequently, the axial deflection of the one of the blades 24 is expected to decrease.

Figure 6A:
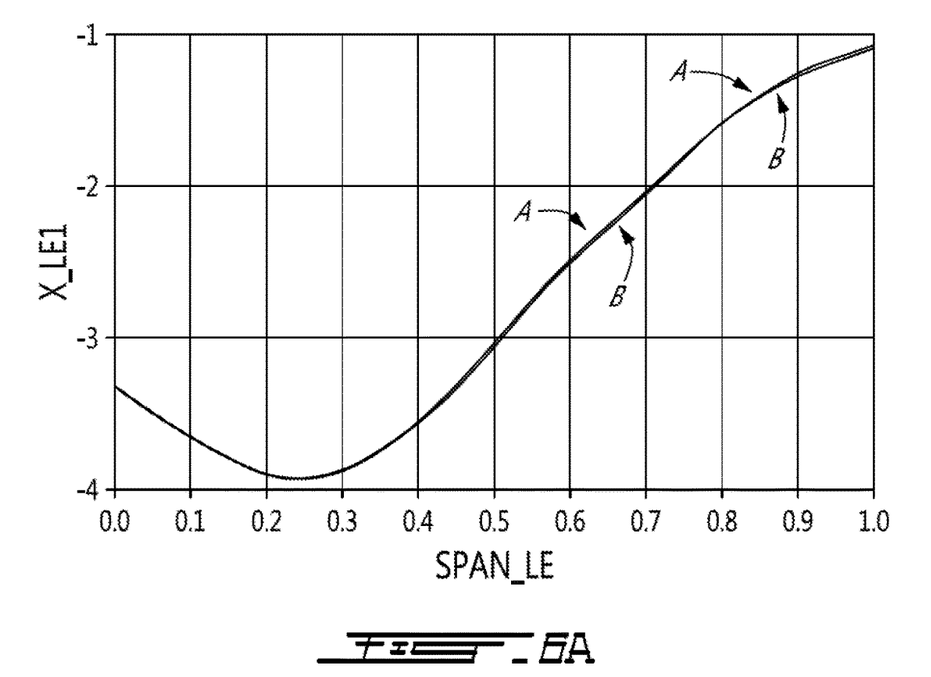
FIGS. 6a and 6b are graphs illustrating a variation of axial positions of leading edges of two consecutive blades of the fan rotor of FIG. 2 in function of a span wise position.
Figure 6B:
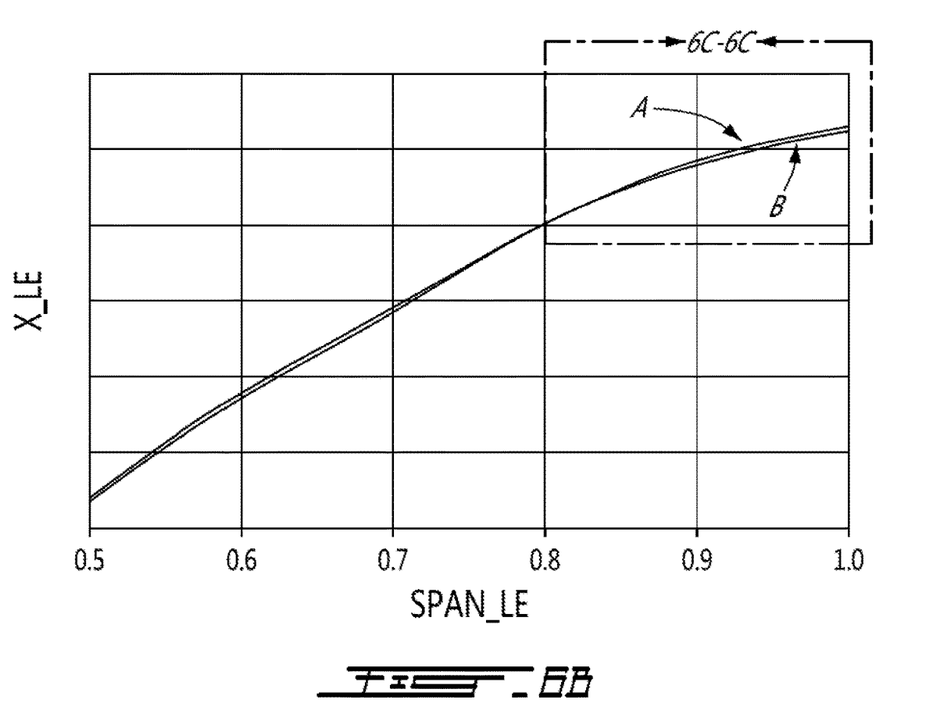
Figure 6C:
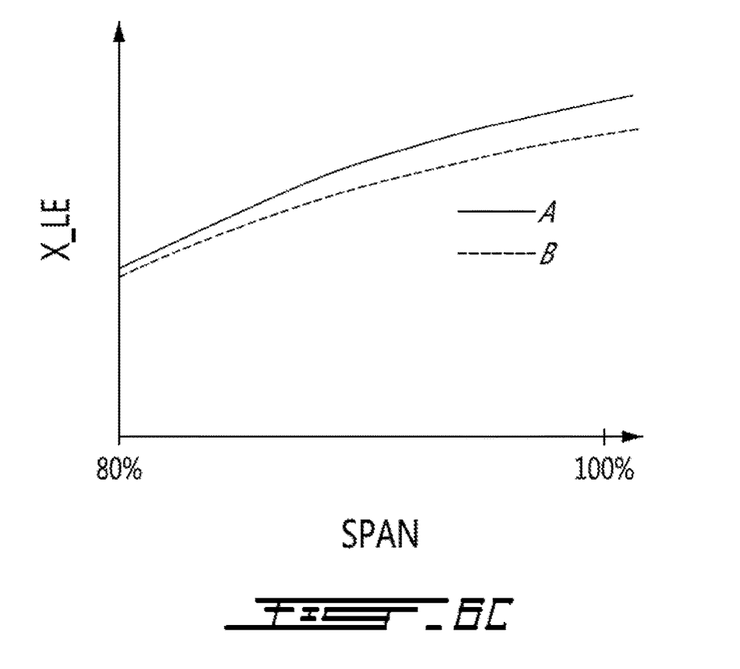
FIG. 6c is an enlarged portion of the graph of FIG. 6b, within the region 6c of FIG. 6b, in which a difference between the two curves has been exaggerated for illustration purposes.

Referring now to FIGS. 6a, 6b, and 6c, a variation of the axial positions of the leading edges 28a, 30a of the first blades 28 (line A) and of the second blades 30 (line B) is shown. As can be seen, at about 80% of the span of the blades, the leading edge of the first blades 28 shifts to become axially forward of the leading edge of the second blades 30. At about 80% of the span of the blades, the first blade leading edges 28a are axially aligned with the second blade leading edges 30a. Therefore, in the embodiment depicted in the graphs of FIGS. 6a-6b, a leading edge profile of the first blades 28 is different than that of the second blades 30.

Figure 7:
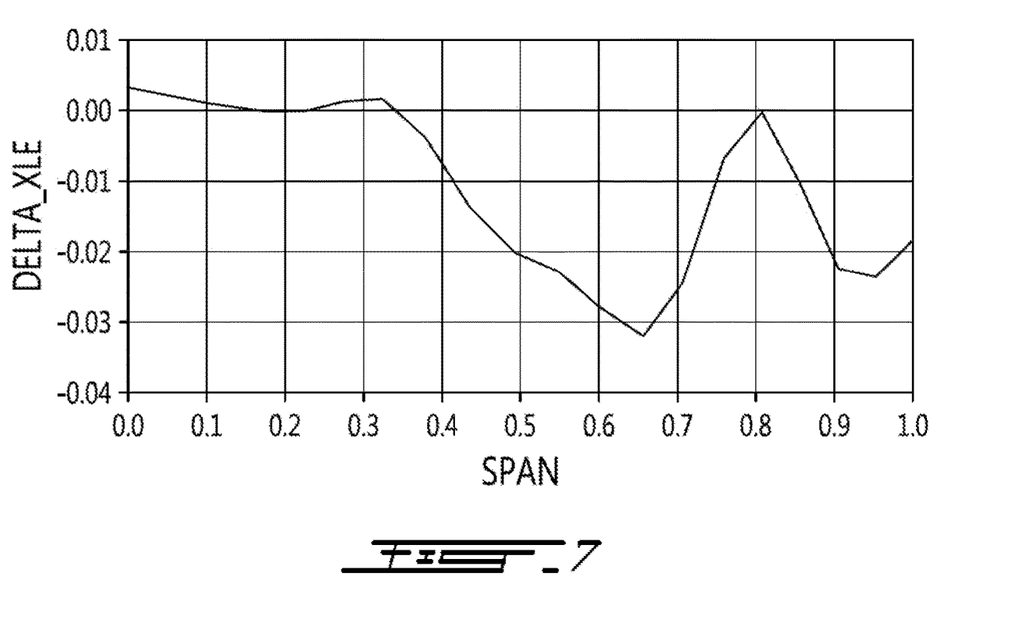
FIG. 7 is a graph illustrating a variation of a difference between the axial positions of the leading edges of the two consecutive blades in function of their span wise position.
Figure 8:
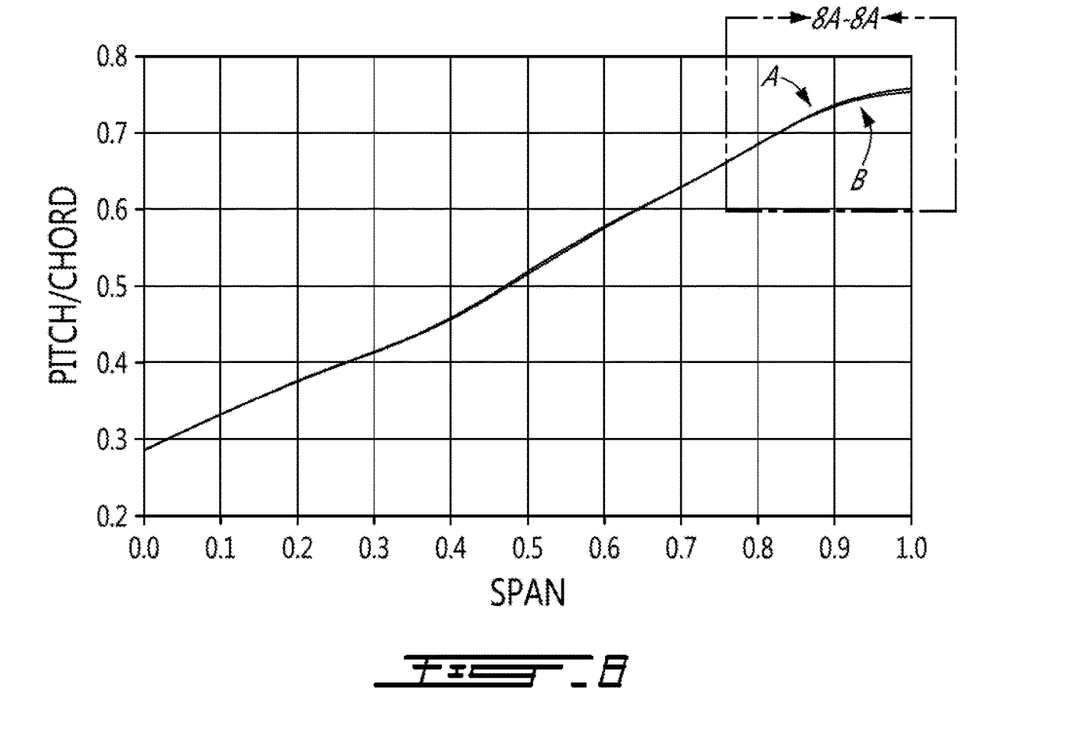
FIG. 8 is a graph illustrating a variation of a ratio of a circumferential gap between the two consecutive blades over respective chords of the two consecutive blades in function of their span wise position.
Figure 8A:
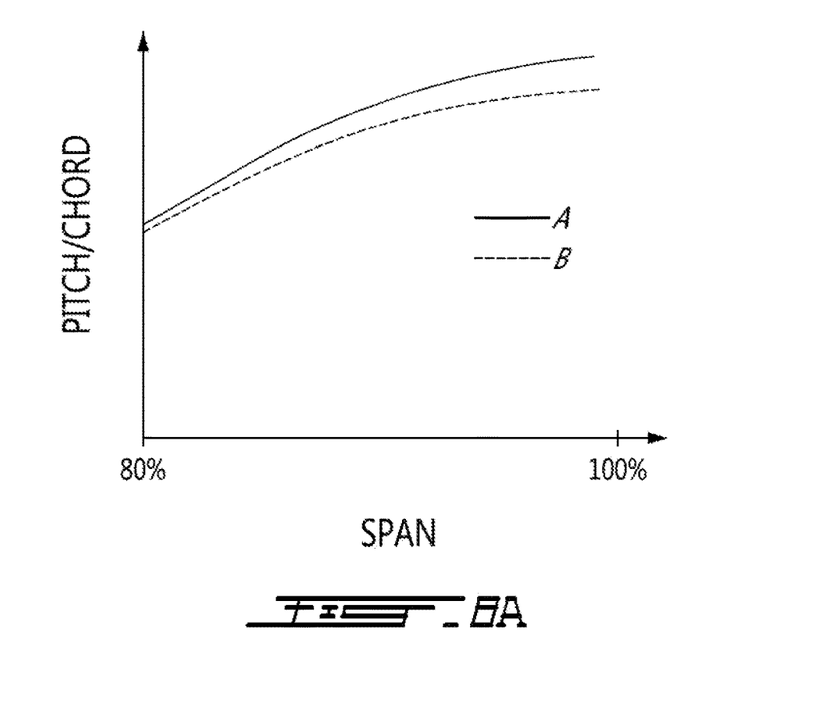
FIG. 8a is an enlarged portion of the graph of FIG. 8, within the region 8a of FIG. 8, in which a difference between the two curves has been exaggerated for illustration purposes.

Referring now to FIG. 7, a variation of a difference between the axial positions of the leading edges 28a, 30a of the first and second blades 28 (line A), 30 (line B) is shown. As can be seen, the difference is negative from about 80% of the span up to 100% of the span, meaning that the second blade leading edges 30a are axially rearward to the first blade leading edges 28a within this span-wise region. The difference is more pronounced from 90% of the span toward the extreme tips of the blades.

Still referring to FIG. 7, the second blade leading edge 30a is axially rearward of the first blade leading edge 28a from about 35% to about 80% of the span, and the axial gap is minimal between about 50% to about 70% of the span. In the embodiment shown, both a central section and a tip section of the second blades 28 are protected by the first blades 30.

Figure 9:
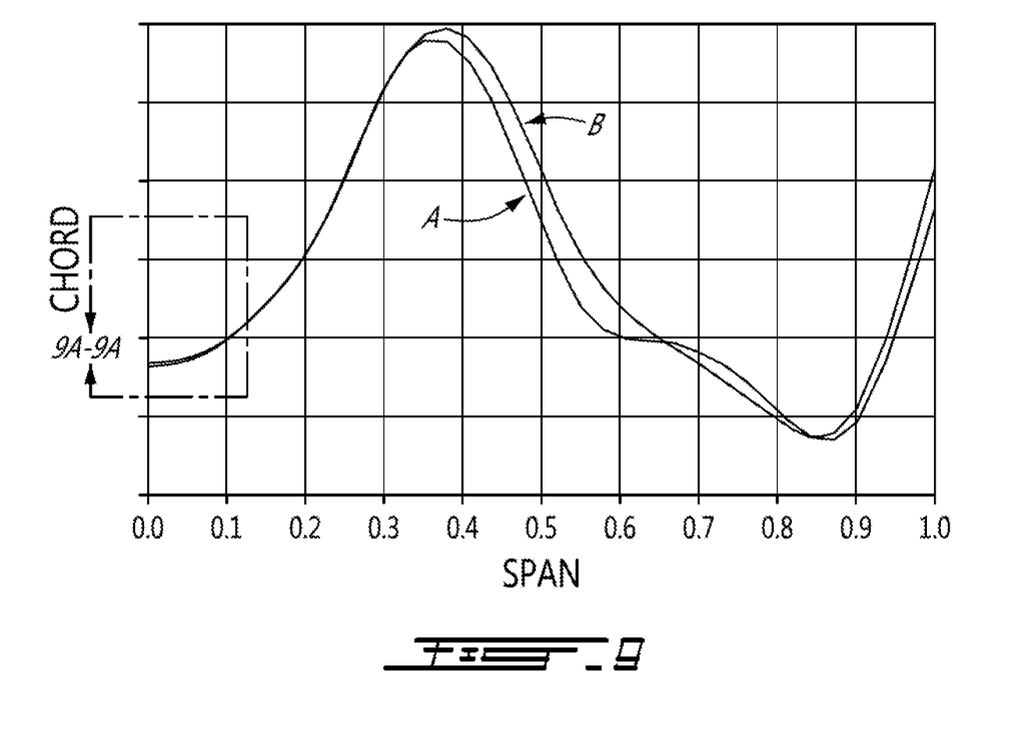
FIG. 9 is a graph illustrating a variation of chords of the two consecutive blades in function of the span wise position.
Figure 9A:
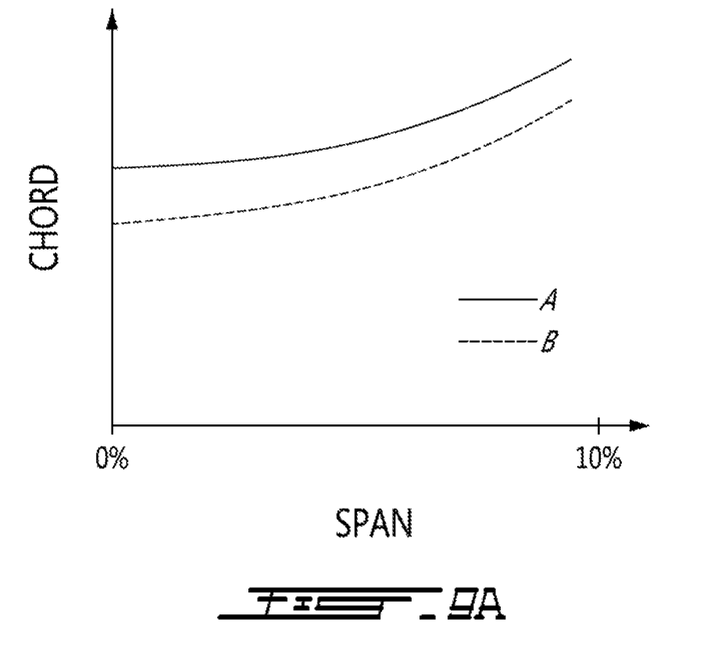
FIG. 9a is an enlarged portion of the graph of FIG. 9, within the region 9a of FIG. 9, in which a difference between the two curves has been exaggerated for illustration purposes.

Referring now to FIGS. 8, 8a, 9, and 9a, a variation of a ratio of a circumferential gap between the first and second blades 28 (line A), 30 (line B) over respective chords of said blades (FIG. 8) and a hub-to-tip variation of chord lengths of the first and second blades 28, 30 (FIG. 9) are shown as a function of a span wise position. As illustrated, between about 90% and about 100% of the span, the ratio is greater for the first blades 28 than for the second blades 30, while the chords of both the first and second blades 28, 30 increase sharply and at similar rates. This implies that, in the depicted embodiment, the circumferential gap between the first and second blades 28, 30 increases when approaching the tip and is greater at the tip than close to the hub 22. As shown in FIG. 9, a variation of the chord length of the first blades 28, from the hub 22 to the tips 34 thereof, is different than that of the second blades 30.

Figure 10:
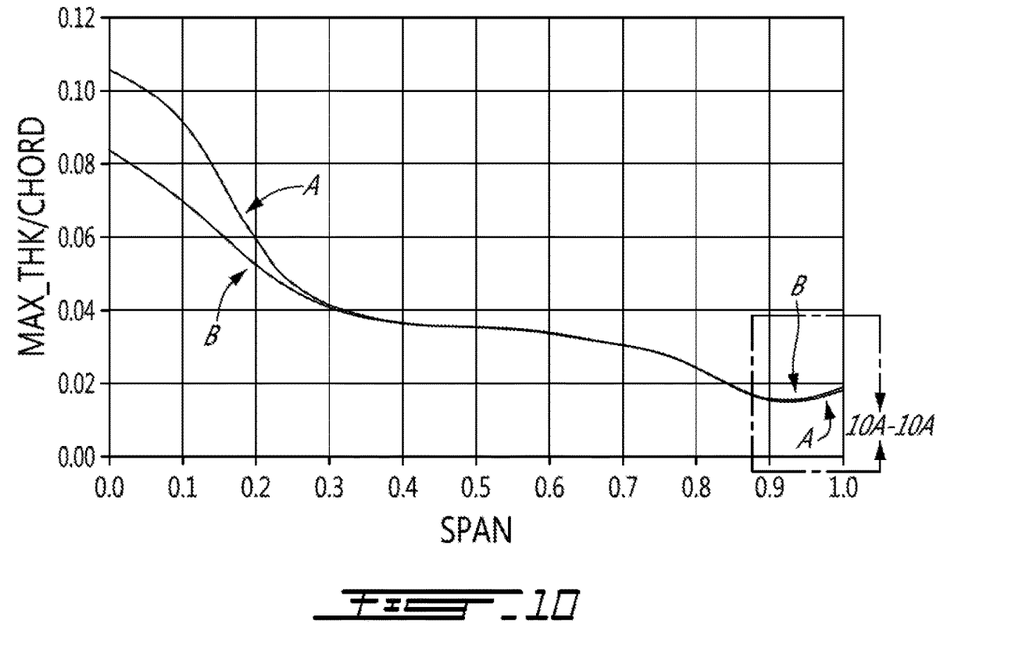
FIG. 10 is a graph illustrating a variation of a ratio of a maximum thickness of the two consecutive blades over the respective chords of the two consecutive blades in function of their span wise position.
Figure 10A:
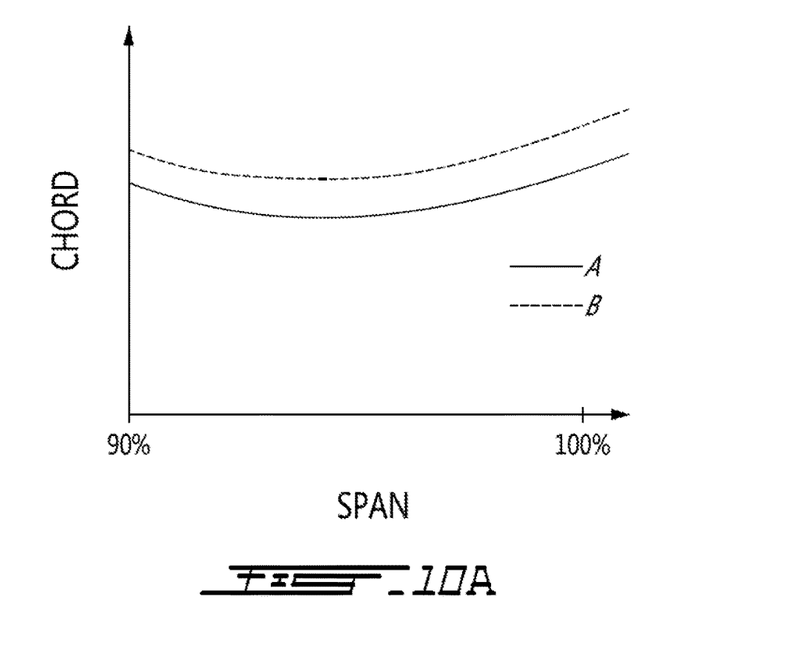
FIG. 10a is an enlarged portion of the graph of FIG. 10, within the region 10a of FIG. 10, in which a difference between the two curves has been exaggerated for illustration purposes.

Referring now to FIGS. 10 and 10a, a variation of a ratio of a maximum thickness of the first and second blades 28 (line A), 30 (line B) over the respective chords of said blades as a function of a span wise position is shown. More specifically, the airfoils are defined by airfoil sections disposed serially from the hub to the tips of the blades, each of the airfoil sections has a respective maximum thickness. Airfoil sections of the first blades 28 have a distribution of maximum thicknesses from the hub to the tips different than a distribution of maximum thicknesses of the second blades 30. Indeed, as can be seen on FIG. 10, both of the blades 28 and 30 are thicker near the hub compared to the tip. Moreover, the first blades 28 have a greater maximum thickness near the hub than the second blades 30. More specifically, the difference between thicknesses of the first and second blades 28, 30 is greatest at the hub 22 and decreases continuously up to a span wise position corresponding to about 35% of the span. Beyond 35% of the span, the first and second blades 28, 30 have similar maximum thickness over chord ratios. In one particular embodiment, the second blades 30 have a thickness that is greater than that of the first blades 28 at their respective tips. Accordingly, the first and second blades 28, 30 may have thicknesses at their tips which are different from each other.

Referring now to FIGS. 9 and 10a, at about 90% of the span, the second blades 30 have a maximum thickness over chord ratio greater than that of the first blades 28 and, as aforementioned, the chords of the first and second blades 28, 30 increase sharply from 90% of the span toward the tip of the blades. This means that, in the embodiment shown, the maximum thickness of the second blades 30 is greater than that of the first blades 28 between about 90% and about 100% of the span.

Referring to all figures, with respect to the present method of forming the rotor or fan 12, the first blades 28 and the second blades 30 are provided. The first blades 28 have a natural vibration frequency different than a natural vibration frequency of the second blades 30. Then, at least one of the second blades 30 is circumferentially positioned between two of the first blades 28. Then, at least one of the second blades 30 is axially offset relative to the two of the first blades 28 by positioning the leading edge 30a of the second blades 30 axially aft of the leading edge 28a of the first blades 28 in at least a portion of an outermost 10% of the full span of the first and the second blades 28, 30. Then, the first and second blades 28, 30 are fastened to the hub 22 of the fan 12.

The first blades 28 and the second blades 30 may be provided such that the first blades 28 have a variation of maximum thicknesses from the hub 22 to the tips 34 that is different than a variation of maximum thicknesses of the second blades 30 from the hub 22 to the tips 34. In the embodiment shown, the first blades 28 are formed to be more resistant to foreign object damage than the second blades 30. The first blades 28 may be provided with first geometric parameters and the second blades may be provided with second geometric parameters different from the first geometric parameters.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A fan for a gas turbine engine, the fan configured for rotation about a rotational axis defining an axial direction, the fan comprising blades circumferentially distributed around a hub, each of the blades having a leading edge and a trailing edge, the blades including at least a plurality of first blades and a plurality of second blades, the first blades having different geometric parameters and/or material properties than the second blades so as to frequency mistune the first and second blades, and such that the first blades are structurally stronger and more resistant to foreign object damage than the second blades, the first and second blades circumferentially distributed around the hub such that at least one second blades is circumferentially disposed between two adjacent first blades, wherein the leading edge of the at least one second blades is disposed axially aft of the corresponding leading edges of the two adjacent first blades in at least a portion of an outermost 10% of a full span of the respective first and second blades.

2. The fan of claim 1, wherein the respective first and second blades are defined by a plurality of airfoil sections disposed serially from the hub to tips of the respective first and second blades, the plurality of airfoil sections of the first blades having a distribution of maximum thicknesses from the hub to the tips that is different than a distribution of maximum thicknesses from the hub to the tips of the second blades.

3. The fan of claim 1, wherein a stiffness of the first blades is greater than a stiffness of the second blades.

4. The fan of claim 1, wherein a hub-to-tip variation of a chord length of the first blades is different than that of the second blades.

5. The fan of claim 1, wherein a thickness of the first blades and a thickness of the second blades are different in at least the portion of the outermost 10% of the full span of the respective first and second blades.

6. The fan of claim 1, wherein a thickness of the first blades at the hub is greater than a thickness of the second blades at the hub.

7. The fan of claim 1, wherein the leading edge of the at least one second blades is disposed axially aft of the corresponding leading edges of the two adjacent first blades over an entirety of the outermost 10% of the full span, from 90% of the full span to tips of the respective first and second blades.

8. The fan of claim 1, wherein the leading edge of the at least one second blades is disposed axially aft of the corresponding leading edges of the two adjacent first blades in at least a portion of an outermost 5% of the full span of the respective first and second blades.

9. The fan of claim 8, wherein the leading edge of the at least one second blades is disposed axially aft of the corresponding leading edges of the two adjacent first blades over an entirety of the outermost 5% of the full span, from 95% of the full span to tips of the respective first and second blades.

10. The fan of claim 1, wherein the respective first and second blades are circumferentially distributed around the hub in an alternating manner.

11. The fan of claim 1, wherein a drag coefficient of the first blades is greater than that of the second blades.

12. The fan of claim 1, wherein the second blades are more aerodynamically efficient than the first blades.

13. The fan of claim 1, wherein the first blades have a natural vibration frequency different than a natural vibration frequency of the second blades.

14. The fan of claim 1, wherein the fan is an integrally bladed rotor.

15. The fan of claim 1, wherein the leading edge of the at least one second blades disposed axially aft of the corresponding leading edges of the two adjacent first blades defines an axial offset, the axial offset corresponding to about 5% to 30% of a chord length of the respective first and second blades.

16. The fan of claim 15, wherein the axial offset corresponds to about 6% to 8% of the chord length of the respective first and second blades.

17. The fan of claim 1, wherein the first and second blades each have a respective center of gravity between their respective leading and trailing edges, the center of gravity of the second blades disposed axially aft of the center of gravity of the first blades.

18. A gas turbine engine having a fan configured for rotation about a rotational axis defining an axial direction, the fan comprising blades circumferentially distributed around a hub, each of the blades having a leading edge and a trailing edge, the blades including a first subset of blades and a second subset of blades, the blades of the first subset of blades having different geometric parameters and/or material properties than the second subset of blades, and such that the first subset of blades is structurally stronger and more resistant to foreign object damage than the second subset of blades, the first subset of blades having a natural vibration frequency different than a natural vibration frequency of the second subset of blades so as to frequency mistune the respective blades of the first and second subsets of blades, the blades of the second subset of blades being circumferentially interspaced between blades of the first subset of blades, wherein the leading edges of the blades of the second subset of blades are disposed axially aft of the corresponding leading edges of the blades of the first subset of blades in at least a portion of an outermost 10% of a full span of the respective blades of the first and second subsets of blades.

19. The gas turbine engine of claim 18, wherein the different geometric parameters and/or material properties of the respective blades may include at least one of a mass, an elastic modulus, a stiffness, a constituent material, a blade thickness, a thickness distribution along the span, a tip profile, and a leading edge profile.

20. The gas turbine engine of claim 18, wherein the respective blades of the first and second subsets of blades are defined by a plurality of airfoil sections disposed serially from the hub to tips of the respective blades of the first and second subsets of blades, the plurality of airfoil sections of the blades of the first subset of blades having a distribution of maximum thicknesses from the hub to the tips that is different than a distribution of maximum thicknesses from the hub to the tips of the blades of the second subset of blades.

21. The gas turbine engine of claim 18, wherein a stiffness of the blades of the first subset of blades is greater than a stiffness of the blades of the second subset of blades.

22. The gas turbine engine of claim 18, wherein a hub-to-tip variation of a chord length of the blades of the first subset of blades is different than that of the blades of the second subset of blades.

23. The gas turbine engine of claim 18, wherein a thickness of the blades of the first subset of blades and a thickness of the blades of the second subset of blades are different in at least the portion of the outermost 10% of the full span of the respective blades of the first and second subsets of blades.

24. The gas turbine engine of claim 18, wherein a thickness of the blades of the first subset of blades at the hub is greater than a thickness of the blades of the second subset of blades at the hub.

25. The gas turbine engine of claim 18, wherein the leading edges of the blades of the second subset of blades are disposed axially aft of the corresponding leading edges of the blades of the first subset of blades over an entirety of the outermost 10% of the full span of the respective blades of the first and second subsets of blades, from 90% of the full span to tips of the respective blades of the first and second subsets of blades.

26. The gas turbine engine of claim 18, wherein the leading edges of the blades of the second subset of blades are disposed axially aft of the corresponding leading edges of the blades of the first subset of blades in at least a portion of an outermost 5% of the full span of the respective blades of the first and second subsets of blades.

27. The gas turbine engine of claim 26, wherein the leading edges of the blades of the second subset of blades are disposed axially aft of the corresponding leading edges of the blades of the first subset of blades over an entirety of the outermost 5% of the full span of the respective blades of the first and second subsets of blades, from 95% of the full span to tips of the respective blades of the first and second subsets of blades.

28. The gas turbine engine of claim 18, wherein the fan is an integrally bladed rotor.

29. The gas turbine engine of claim 18, wherein the respective blades of the first and second subsets of blades are circumferentially distributed around the hub in an alternating manner.

30. A method of forming a fan of a gas turbine engine, the method comprising:
providing first blades and second blades, each of the blades having a leading edge and a trailing edge, the first blades having different geometric parameters and/or material properties than the second blades so as to frequency mistune the first and second blades, and such that the first blades are structurally stronger and more resistant to foreign object damage than the second blades;
circumferentially positioning at least one second blades between two adjacent first blades, and axially offsetting the at least one second blades relative to the two adjacent first blades by positioning the leading edge of the at least one second blades axially aft of the corresponding leading edges of the two adjacent first blades in at least a portion of an outermost 10% of a full span of the respective first and second blades; and
fastening the first and second blades to a hub of the fan.

31. The method of claim 30, wherein providing the first blades and the second blades comprises providing the first blades with a variation of maximum thicknesses from the hub to tips of the first blades that is different than a variation of maximum thicknesses from the hub to tips of the second blades.

32. The method of claim 30, wherein the different geometric parameters and/or material properties of the respective blades may include at least one of a mass, an elastic modulus, a stiffness, a constituent material, a blade thickness, a thickness distribution along the span, a tip profile, and a leading edge profile.

33. The method of claim 30, further comprising providing the first blades with a natural vibration frequency different than a natural vibration frequency of the second blades.

\* \* \* \* \*